United States Patent
Thompson et al.

(10) Patent No.: US 10,032,368 B1
(45) Date of Patent: Jul. 24, 2018

(54) METHOD AND APPARATUS FOR MEASUREMENT OF PARKING DURATION FROM ANONYMIZED DATA

(71) Applicant: HERE GLOBAL B.V., Eindhoven (NL)

(72) Inventors: Joshua Thompson, Chicago, IL (US); Xiang Liu, Eindhoven (NL); Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/611,483

(22) Filed: Jun. 1, 2017

(51) Int. Cl.
- B60Q 1/48 (2006.01)
- G08G 1/01 (2006.01)
- G08G 1/14 (2006.01)

(52) U.S. Cl.
CPC ........... G08G 1/0137 (2013.01); G08G 1/141 (2013.01)

(58) Field of Classification Search
CPC ...... G07B 15/02; G01C 21/3685; G08G 1/14; G08G 1/144; G08G 1/148; G08G 1/141; G08G 1/0137
USPC .................. 340/932.2; 705/13; 701/426, 438
See application file for complete search history.

(56) References Cited

U.S. PATENT DOCUMENTS

| 3,867,615 | A | 2/1975 | Sioufi |
| 7,936,284 | B2 | 5/2011 | Levine et al. |
| 8,423,275 | B1 | 4/2013 | Kandal |
| 8,963,740 | B2 | 2/2015 | Koukoumidis et al. |
| 2011/0015934 | A1* | 1/2011 | Rowe .................. G08G 1/14 340/932.2 |
| 2012/0135746 | A1 | 5/2012 | Mohlig et al. |
| 2013/0211699 | A1 | 8/2013 | Scharmann et al. |
| 2013/0257632 | A1 | 10/2013 | Harber et al. |
| 2014/0058711 | A1 | 2/2014 | Scofield |
| 2014/0266804 | A1 | 9/2014 | Asadpour |

(Continued)

FOREIGN PATENT DOCUMENTS

| JP | 2001043492 A | 2/2001 |
| WO | 2015143097 A1 | 9/2015 |

OTHER PUBLICATIONS

Levashev et al., "Modelling Parking Based Trips", The Sustainable City VIII, vol. 2, WIT Transactions on Ecology and The Environment, vol. 179, 2013, pp. 1067-1076.

(Continued)

*Primary Examiner* — Thomas Mullen
(74) *Attorney, Agent, or Firm* — Ditthavong & Steiner, P.C.

(57) ABSTRACT

An approach is provided for measuring parking duration from anonymized data. The approach involves receiving parking data indicating anonymized park in and park out events from connected vehicles. The approach also involves performing a first filtering of the parking data to remove the park out events that occur within a time interval and before a first park in event occurring within the time interval, and to remove the park in events that occur within the time interval and after a last park out event occurring within the time interval. The approach further involves performing a second filtering of the parking data remaining after the first filtering to remove park in events or park out events so that the numbers of park in and park out events are balanced. The approach then involves calculating parking duration data from the park in and park out events remaining after the second filtering.

20 Claims, 13 Drawing Sheets

(56) References Cited

U.S. PATENT DOCUMENTS

| | | |
|---|---|---|
| 2015/0187213 A1 | 7/2015 | Amir |
| 2016/0111004 A1 | 4/2016 | Delmas |
| 2016/0196747 A1 | 7/2016 | Tsyrklevich |
| 2017/0178511 A1* | 6/2017 | Berns .................... G08G 1/143 |

OTHER PUBLICATIONS

Cao et al., "Methodology for Evaluating Cost and Accuracy of Parking Patrol Surveys", Transportation Research Board Annual Meeting, 2013, 15 Pages.

Haghani et al., "Automated Low-cost and Real-time Truck Parking Information System", State Highway Administration, Nov. 2013, 80 Pages.

Xu et al., "Real-time Street Parking Availability Estimation", 14th International Conference on Mobile Data Management (MDM), Jun. 2013, 10 Pages.

Hossinger et al., "Development of a Real-Time Model of the Occupancy of Short-Term Parking Zones", International Journal of Intelligent Transportation Systems Research, vol. 12, No. 2, May 2014, 11 Pages.

Larson et al., "Congestion Pricing: A Parking Queue Model", Journal of Industrial and Systems Engineering, vol. 4, No. 1, 2010, pp. 1-17.

Nandugudi et al., "PocketParker: Pocketsourcing Parking Lot Availability", Proceedings of the 2014 ACM International Joint Conference on Pervasive and Ubiquitous Computing (UbiComp'14), Sep. 13-17, 2014, 11 Pages.

Gautam, "Analysis of Queue: Methods and Applications", Operations Research, CRC Press, 2012, 9 Pages.

* cited by examiner

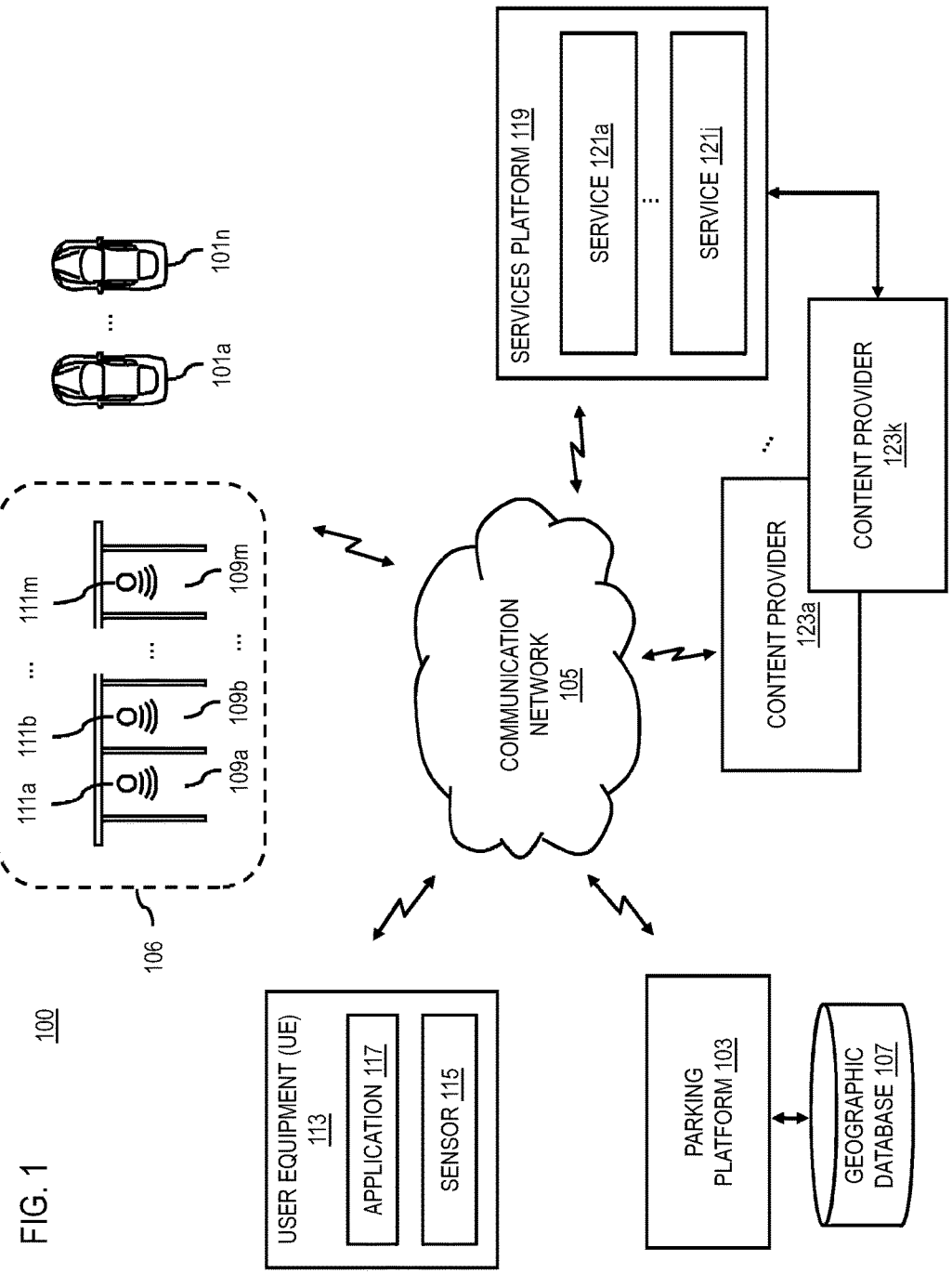

METHOD AND APPARATUS FOR MEASUREMENT OF PARKING DURATION FROM ANONYMIZED DATA

BACKGROUND

Providing on-street parking navigation options is an area of interest for many navigation service providers and original equipment manufacturers (OEMs). To help provide such options, service providers often use parking duration data to model parking behaviors along various streets. One source of this data is from connected cars or other vehicles that report parking related data (e.g., park in and park out events) as they travel in a road network. However, for privacy reasons, it is not always possible to determine parking duration data directly from connected vehicles. This is because knowledge of the identity of a specific vehicle has been traditionally required to link a reported park in event with a park out event to calculate a parking duration for the vehicle. Accordingly, service providers face significant technical challenges to determining parking durations from parking data that has been anonymized with respect to the vehicle from which the data was collected, or for which there is no association between a given park in event and a corresponding park out event.

SOME EXAMPLE EMBODIMENTS

Therefore, there is a need for an approach for measuring parking duration from anonymized data.

According to one embodiment, a method comprises receiving parking data from a plurality of connected vehicles. The parking data indicate park in events, park out events, or a combination thereof that are not associated with each other to anonymize the parking data. The method also comprises performing a first filtering of the parking data to remove the park out events that occur within a time interval and that occur before a first one of the park in events occurring within the time interval, and to remove the park in events that occur within the time interval and that occur after a last one of the park out events that occur within the time interval. The method further comprises performing a second filtering of the parking data remaining after the first filtering to remove one or more of the park in events or one or more of the park out events so that a number of the park in events is balanced with a number of the park out events. The method further comprises calculating parking duration data from the park in events and the park out events remaining after the second filtering.

According to another embodiment, an apparatus comprises at least one processor, and at least one memory including computer program code for one or more computer programs, the at least one memory and the computer program code configured to, with the at least one processor, cause, at least in part, the apparatus to receive parking data from a plurality of connected vehicles. The parking data indicate park in events, park out events, or a combination thereof that are not associated with each other to anonymize the parking data. The apparatus is also caused to perform a first filtering of the parking data to remove the park out events that occur within a time interval and that occur before a first one of the park in events occurring within the time interval, and to remove the park in events that occur within the time interval and that occur after a last one of the park out events that occur within the time interval. The apparatus is further caused to perform a second filtering of the parking data remaining after the first filtering to remove one or more of the park in events or one or more of the park out events so that a number of the park in events is balanced with a number of the park out events. The apparatus is further caused to calculate parking duration data from the park in events and the park out events remaining after the second filtering.

According to another embodiment, a non-transitory computer-readable storage medium carries one or more sequences of one or more instructions which, when executed by one or more processors, cause, at least in part, an apparatus to receive parking data from a plurality of connected vehicles. The parking data indicate park in events, park out events, or a combination thereof that are not associated with each other to anonymize the parking data. The apparatus is also caused to perform a first filtering of the parking data to remove the park out events that occur within a time interval and that occur before a first one of the park in events occurring within the time interval, and to remove the park in events that occur within the time interval and that occur after a last one of the park out events that occur within the time interval. The apparatus is further caused to perform a second filtering of the parking data remaining after the first filtering to remove one or more of the park in events or one or more of the park out events so that a number of the park in events is balanced with a number of the park out events. The apparatus is further caused to calculate parking duration data from the park in events and the park out events remaining after the second filtering.

According to another embodiment, an apparatus comprises means for receiving parking data from a plurality of connected vehicles. The parking data indicate park in events, park out events, or a combination thereof that are not associated with each other to anonymize the parking data. The apparatus also comprises means for performing a first filtering of the parking data to remove the park out events that occur within a time interval and that occur before a first one of the park in events occurring within the time interval, and to remove the park in events that occur within the time interval and that occur after a last one of the park out events that occur within the time interval. The apparatus further comprises means for performing a second filtering of the parking data remaining after the first filtering to remove one or more of the park in events or one or more of the park out events so that a number of the park in events is balanced with a number of the park out events. The apparatus further comprises means for calculating parking duration data from the park in events and the park out events remaining after the second filtering.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1 is a diagram of a system capable of measuring parking duration from anonymized data, according to one embodiment;

DESCRIPTION OF SOME EMBODIMENTS

Figure 2A:
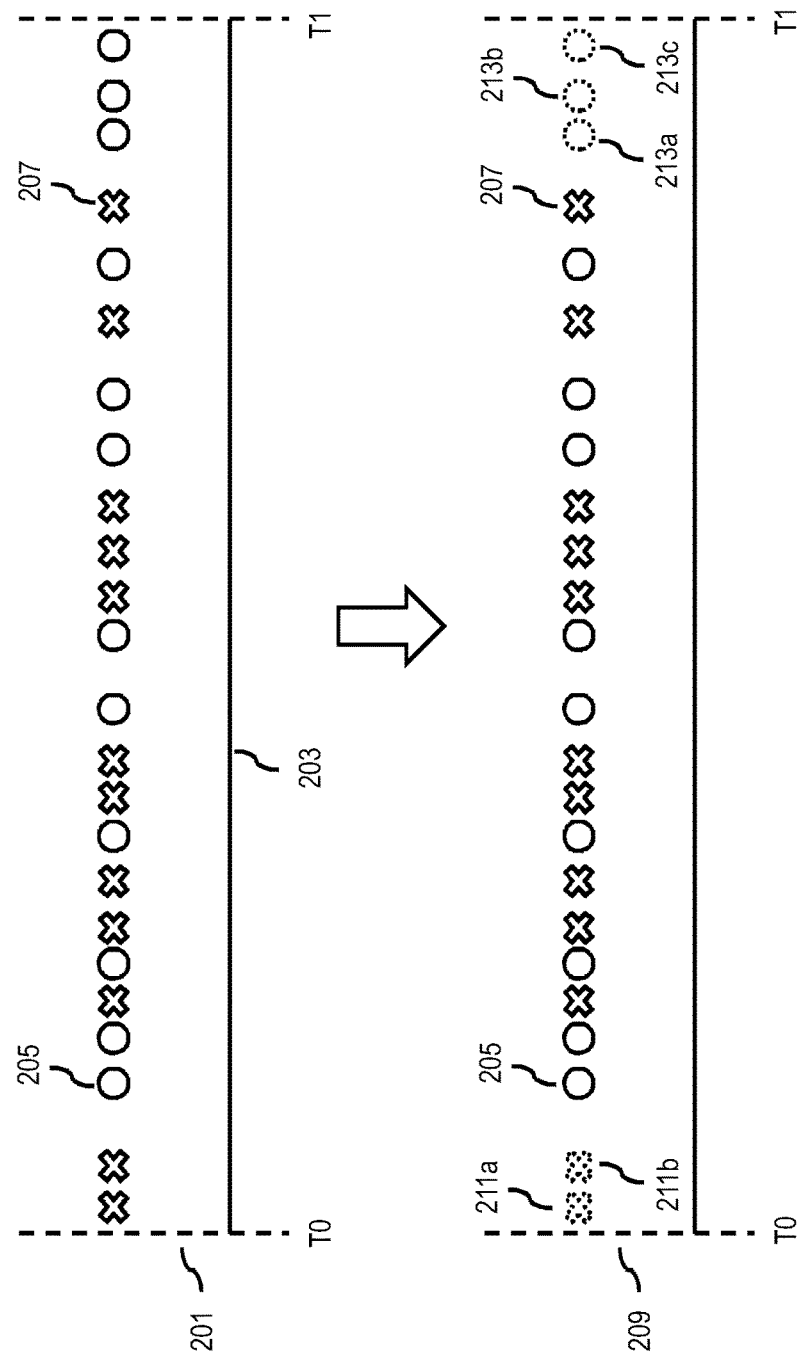
FIGS. 2A and 2B are diagrams illustrating processes for filtering anonymized data to measure parking duration, according to various embodiments.

Examples of a method, apparatus, and computer program for measuring parking duration from anonymized data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1 is a diagram of a system capable of measuring parking duration from anonymized data, according to one embodiment. As discussed above, providing street parking navigation options is an area of interest for service providers, original equipment manufacturers (OEMs), and/other navigation related companies. For example, looking for parking (e.g., on-street parking or parking in other types of parking facilities), particularly in urban or congested areas, can be stressful and difficult for drivers. In some cases, a significant amount of traffic congestion in cities (e.g., approximately 30% in some cases) can be caused by drivers circling around their intended destinations to look for available parking spaces.

Accordingly, OEMs consider a service to provide parking availability information to be a key differentiator from their competition. In one embodiment, some models for parking availability and/or other parking parameters use information about average parking duration as an input. In principle, parking duration data can be trivial to collect from connected vehicles 101a-101n (also collectively referred to as connected vehicles 101 or vehicles 101). The connected vehicles 101, for instance, have connectivity to a parking platform 103 or other cloud component (e.g., OEM-operated servers) over a communication network 105 to provide data about their parking activities with respect to one or more parking areas 106 including parking spaces 109a-109m (also collectively referred to as parking spaces 109) for aggregation and analysis (e.g., generating parking duration data). For example, if a parking arrival event (e.g., a park in event) is received a time $t^A$ from a vehicle 101, and a parking departure event (e.g., a park out event) is received at time-$t^D$ from the same vehicle 101, then parking duration=$t^D$-$t^A$. However, for reasons of privacy, vehicle OEMs or the owners of the vehicles 101 may be reluctant to provide persistent vehicle identifiers (IDs) that would allow the parking platform 103 and/or other cloud service providers to easily link departure events to arrival events. Instead, the connected vehicles 101 may provide "anonymized" parking data that does not have any association between park in events and park out events. Therefore, determination of the duration of each parking instance is not possible.

To address this problem, a system 100 of FIG. 1 introduces a capability to determine parking duration data (e.g., average parking duration) in a parking area 106 (e.g., a road segment with on-street parking, parking garage, parking lot, or other parking facility) using only the timestamp information of "park in" and "park out" events from the connected vehicles 101, without explicit parking duration information or individual vehicle ID information (e.g., anonymized parking data). In this way, the system 100 can advantageously overcome the technical limitations associated with using anonymized data to generate parking duration data resulting from the lack of association between park in and park out events in anonymized parking data.

It is noted that although the various embodiments are discussed with respect to anonymized parking data received from connected vehicle 101, it is also contemplated that that anonymized parking data can also be received from any other equivalent source or means. For example, the parking spaces 109 may be equipped with parking sensors 111a-111m (also collectively referred to as parking sensors 111) for detecting and reporting park in and park out events. In cases where the parking data received from the parking sensors 111 are anonymized so that the park in event and the corresponding park out event of a parking instance are not associated (e.g., via a parking space ID or vehicle ID) and no explicit parking duration is provided, the system 100 can process the park in and park out events to generate parking duration data from the anonymized data of the parking sensors 111.

In other words, the system 100 (e.g., via the parking platform 103) can derive or measure the average parking duration from parking data that has been anonymized. As described above, in one embodiment, parking duration for one vehicle j (e.g., a vehicle 101) can be calculated from the collected parking event data as follows:

Parking Duration$_j = T_j^D - T_j^A$ where $T_j^D$ is the departure time of that vehicle j from a parking space 109 (e.g., a park out event) and $T_j^A$ is the arrival time of that vehicle j at the parking space 109 (e.g., a park in event).

When monitoring a parking area 106 for parking behaviors of multiple vehicles 101 that arrive and leave the parking area 106, the calculation above can be extended to determine an average parking duration <d> of those multiple vehicles 101. Therefore, the average duration <d> is given by:

$$\langle d \rangle = \frac{\Sigma_j (T_j^D - T_j^A)}{N} = \frac{\Sigma_j T_j^D - \Sigma_j T_j^A}{N} \quad (1)$$

where N is the number of vehicles 101 reporting parking event data.

The average duration <d> can also be calculated by:

$$\langle d \rangle = \frac{\Sigma_j T_j^D}{N^D} - \frac{\Sigma_j T_j^A}{N^A}$$

where $N^D$ is the number of vehicles 101 reporting the departure time and $N^A$ is the number of vehicles 101 reporting the arrival time.

In one embodiment, average parking duration might be different depending on time of day, day of week, time of the year, and/or another time interval. Therefore, the system 100 enables the determining of the average parking duration for the parking area 106 (e.g., a road segment or other parking facility) during a specified time interval (e.g., starting at T0 and ending at T1).

In one embodiment, the average parking duration <d> can be calculated with perfect accuracy using the equation (1) above if the parking area 106 is empty at the beginning (e.g., at time T0) and the end (e.g., at time T1) of the specified time interval. However, in reality, this condition might not be the case for many time intervals. For example, the possible presence of vehicles 101 parked in before T0 and parked out between T0 and T1, as well as vehicles 101 parked in between T0 and T1 and parked out after T1 might introduce a substantial distortion to the resulting parking duration data. This substantial distortion, in turn, can adversely affect the parking related services and models that rely on parking duration data.

To resolve this problem and considering that anonymized parking data typically includes just information about park in and park out events, but no information about the numbers of cars actually parked at any time during a time interval [T0, T1], the system 100 further introduces a capability to filter anonymized parking data collected from the vehicles 101, parking sensors 111, and/or other equivalent sources to address the potential distortion of the parking duration data. In other words, the system 100 can remove park in and park out events from the anonymized parking data that are likely to result in the distortion described above. The parking data remaining after the filtering can then be used to generate parking duration data that is not affected by the distortion as much as the unfiltered parking data.

Figure 2B:
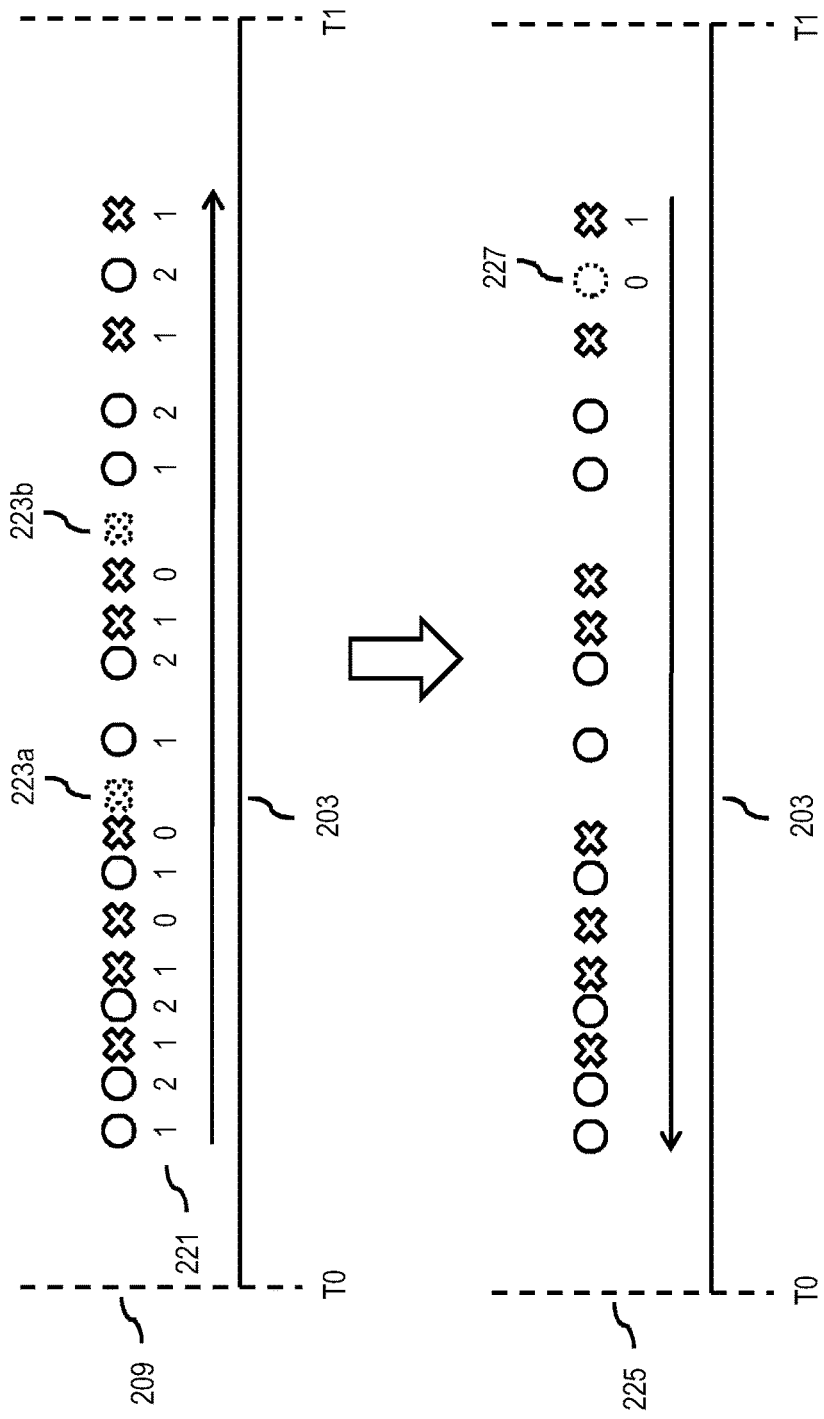

As indicated above, parking data that can be used to calculate parking duration typically is based on monitoring individual parking events that occur in a particular parking area 106. Generally, each parking event begins when a vehicle 101 parks in a parking spot 109 (e.g., a park in event) and ends when the vehicle 101 leaves the parking spot 109 (e.g. a park out event). The period of time between the park in event and the park out event is the parking duration for the vehicle 101. However, when this parking data is anonymized, the association between the park in event and the park out event of an individual parking event is not provided to prevent tracking of an individual vehicle 101 and preserve the vehicle privacy of data contributing the vehicle 101. In other words, anonymized parking data includes a collection of separate park in events and park out events without providing any information to determine which of those park in event and park out events represent individual parking events, or providing an explicit parking duration value for the individual parking events. Examples of anonymized parking data are shown in FIGS. 2A-2B, which are diagrams illustrating processes for filtering anonymized data to measure parking duration, according to various embodiments.

For example, the parking data set 201 represents a set of anonymized parking data for a time interval 203 spanning time T0 and T1. In this example, the park in events are represented using circle symbols and the park out events are represented using "X" symbols. As described above, the anonymized parking data set 201 may cause potential distortion in parking duration data generated from when the parking area 106 from which the parking data set 201 is collected is not completely empty (e.g., no vehicles 101 are parked in the parking area 106) at T0 and T1 of the time interval 203.

In one embodiment, to correct for this distortion, the system 100 can initiate a filtering process by first removing those park in or park out events that may be associated with parking events occurring at least partially outside the time interval 203. For example, the system 100 can remove all park out events that happened within the time interval 203 (e.g., [T0, T1]) but before a first park in event 205 detected within the same time interval 203. The removal of these park out events filters out those parking events that are likely to have been initiated or whose corresponding park in events occurred before the beginning to the time interval 203 (e.g., before T0). Similarly, the system 100 can remove all park in events that happened within the time interval 203 but after the last park out event 207 within the same time interval 203. The removal of these park in events filters out those parking events that are likely to end or whose corresponding park out events occurred after the end of the time interval 203 (e.g., after T1).

Parking data set 209 illustrates the parking data set that results from this first filtering. For example, the system 100 determines that park out events 211a and 211b occur before the first park in event 205, and that park in events 213a-213c occur after the last park out event 207. The park out events 211a-211b and the park in events 213a-213c are then removed from the parking data set 201 to result in the parking data set 209.

In one embodiment, after the first filtering step, the system 100 can perform a second filtering of the remaining parking data set (e.g., parking data set 209) to "balance" the remaining park in and park out events. In other words, the system 100 can filter the remaining park in and park out events so that the number of park in events and the number of park out events are balanced (e.g., are equal to each other). In one embodiment, this balancing enables the system 100 to more accurately approximate non-anonymized parking data from the anonymized parking data because each parking event is a pair of a park in event and a park out event. Any mismatch of the numbers of each in a data set (e.g., parking data set 209) for the time interval 203 indicates that at least one of the remaining park in or park out events correspond to a parking event that occurs at least partially outside the time interval 203.

FIG. 2B provides an example of one process for balancing the park in and park out events remaining after the first filtering. For example, the system 100 can begin with the parking data set 209 resulting from the first filtering. In one embodiment, the system 100 performs the second filtering by calculating a "balance counter" 221 (BC) during the time interval 203 to determine which park in or park out events to remove. The system 100 defines an initial value for the balance counter 221 (e.g., BC=0 or any other initial value).

In one embodiment, the system 100 then traverses the time interval 203 from T0 to T1. Whenever the system 100 encounters a park in event, the system 100 increments the balance counter 221 (e.g., by performing BC=BC+1). Whenever the system 100 encounters a park out event, the system 100 decrements the balance counter 221 (e.g., by performing BC=BC−1). In one embodiment, the system 100 discards or removes any park out event that would make the balance counter 221 less than the initial value (e.g., BC<0 or any other initial value). In the example of FIG. 2B, park out events 223a and 223b would make that balance counter 221 less than the initial value. Accordingly, the park out events 223a-223b are removed from the parking data set 209 to result in a parking data set 225.

In one embodiment, if at the end of the time interval 203, the balance counter 221 is greater than the initial value (e.g., BC>0), the system 100 can infer that there are more park in events than park out events remaining in the parking data set 225, and additional balancing or filtering can be performed. Accordingly, the system 100 can re-traverse the time interval 203 from the opposite time direction (e.g., from T1 to T0) and discard any encountered park in events until the balance counter 221 equals the initial value (e.g., until BC=0). In the example of FIG. 2B, the first encountered park in event 227 is removed from the parking data set 225 to bring the balance counter 221 equal to 0 and end the second filtering.

In one embodiment, the system 100 then uses the filtered parking data (e.g., parking data remaining after the first and second filtering processes such as parking data set 225) to generate parking duration data. For example, when calculating parking duration using the average parking duration equation (1) described above, the system 100 can use time stamps of remaining park in events as $T_j^A$ and the time stamps of the remaining park out events as $T_j^D$ in the equation (1). In addition, the system 100 can use the number of remaining park in (or park out) events as N (e.g., the number of vehicles 101 or parking events) in equation (1).

Figure 3A:
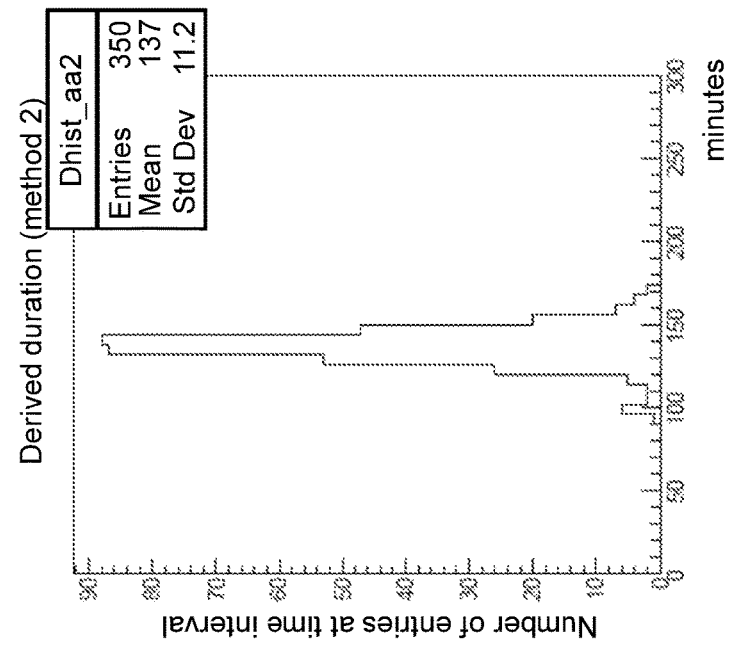
FIGS. 3A and 3B are diagrams comparing parking duration data generated using filtered versus unfiltered parking data, according to one embodiment.
Figure 3B:
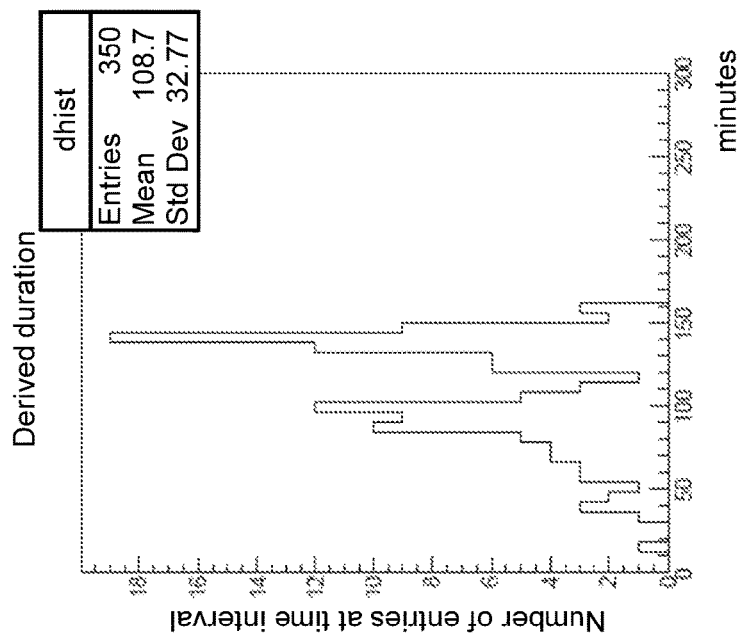

FIGS. 3A and 3B are diagrams comparing parking duration data generated using filtered versus unfiltered parking data, according to one embodiment. In the example of FIGS. 3A and 3B, anonymized parking data is generated using a parking simulator. The simulator, for instance, emulates the arrival and departure of vehicles 101 to/from a block of a fixed number of parking spaces 109 in a parking area 106. For the results shown in FIGS. 3A and 3B, the average parking duration in the simulator is set to be 140 minutes, and 350 sequential days of parking are simulated. This simulated parking data is then sliced into 1-day chunks and each chunk processed according to the various embodiments described herein. FIG. 3A illustrates parking duration data generated using the average parking duration equation (1) above without performing the filtering processes discussed with respect to the various embodiments. As shown in FIG. 3A, the mean parking duration is found to be 108.7 minutes, significantly lower than the true value of 140 minutes. FIG. 3B illustrates parking duration data generated using the filtering processes according to the various embodiments described herein, where a mean parking duration of 137 minutes is found—less than 3% from the true value.

Accordingly, the various embodiments of the system 100 advantageously results in technical improvements to parking related services and devices (e.g., navigation or mapping services and devices) by enabling the use of anonymized data that preserves privacy while also taking advantage of more readily available anonymized data. Therefore, service providers, OEMs, device manufacturers, etc. can potentially avoid the significant technical burdens and challenges associated with gathering non-anonymized parking data that also meet any privacy requirements.

Although various embodiments are described with respect to parking spaces 109 that are on-street parking along road links or street segments, it is contemplated that the embodiments are also applicable to determining parking occupancy data for any parking facility (e.g., parking garages, parking lots, etc.) represented in a geographic database 107.

Returning to FIG. 1, the system 100 includes the parking platform 103 for performing the processes for measuring parking duration from anonymized data according to the various embodiments described herein. As shown, the parking platform 103 has connectivity to a parking data infrastructure comprising the connected vehicles 101, and/or parking sensors 111 (e.g., in-ground parking sensors or equivalent) embedded in the parking spaces 109. It is noted that embedded parking sensors 111 currently remain expensive to install and maintain; and their availability for generating parking data for use according to the various embodiments described herein also remains limited. Accordingly, in the near future, it is expected that a significant portion of parking data will be collected from the connected vehicles 101. For example, each vehicle 101 can be equipped with sensors (e.g., location sensors) that can also detect when the vehicle 101 parks in or leaves a parking space 109, for storage or transmission as anonymized parking data from which parking duration data can be generated according to the various embodiments described herein.

In one embodiment, the vehicles 101 and/or one or more user equipment 113 associated with a vehicle 101 can act as probes traveling over a road network represented in the geographic database 107. Although the vehicle 101 is depicted as an automobile, it is contemplated that the vehicle 101 can be any type of transportation vehicle manned or unmanned (e.g., motorcycles, buses, trucks, boats, bicycles, etc.) capable of parking in a parking space 109, and the UE 113 can be associated with any of the types of vehicles 101 or a person or thing traveling through the road network of the geographic database 107. For example, the UE 113 can be a standalone device (e.g., mobile phone, portable navigation device, wearable device, etc.) or installed/embedded in the vehicle 101. In one embodiment, the vehicle 101 and/or UE 113 may be configured with one or more sensors 115 for determining parking data. By way of example, the sensors 115 may include location sensors (e.g., GPS), accelerometers, compass sensors, gyroscopes, altimeters, etc. In one embodiment, the sensors 115 can also be used to detect and report status data about an operational state of the vehicle 101 to assist in determining when the vehicle 101 parks in or leaves a parking space 109. For example, a parking event may be detected when it is determined that a vehicle's engine is off, the key is outside of the car, the vehicle door is locked, and/or the like. In one embodiment, the vehicle 101 and/or UE 113 are assigned unique probe identifiers (vehicle ID or probe ID) for use in reporting or transmitting collected probe data for determining parking occupancy data. The vehicle 101 and UE 113, for instance, are part of a probe-based system for collecting probe data. While the unique probe identifiers are typically known to OEMs who first collect the probe data. These OEMs typically anonymize the parking data reported from the vehicles 101 before providing that data to the parking platform 103. As a result, the parking data provided to the parking platform 103 is provided only as a set of park in and park out events with no association between the events or no explicit parking duration data.

In one embodiment, when a vehicle 101 and/or UE 113 (e.g., via a navigation system, navigation application 117, and/or the like) requests instructions to find parking in a given area or location, the parking platform 103 can use parking duration data (e.g., as generated according to the various embodiments described herein) to determine a parking availability for the given area in which parking is requested. The parking platform 103 can then provide the parking duration data and/or the parking availability data determined from the parking duration data to the vehicle 101 and/or the UE 113 for presentation in a mapping or navigation user interface. For example, the parking duration data generated from anonymized parking data can be used to route a user (e.g., routing to a nearest parking area to the user's destination with parking availability), to provide a better estimated time of arrival (ETA) at a given destination depending on parking availability, etc.

In one embodiment, as noted above, the vehicles 101 are equipped with an embedded navigation systems or other navigation devices (e.g., a UE 113) that are capable of submitting requests for parking information (e.g., parking duration data, parking availability, etc.), and of guiding a driver of the vehicle 101 along a navigation route using the parking information. In one embodiment, as the driver navigates along the received route, the vehicles 101 and/or UE 113 (e.g., via a navigation application 117) may receive real-time updates on parking duration and/or parking availability data predicted for road links or street segments based on the parking duration data near a destination of the navigation route (e.g., links or street segments within a threshold distance of the destination).

In one embodiment, requests for parking instructions or information (e.g., parking duration data) can be triggered by interactions with a user interface of the vehicle 101 and/or UE 113 (e.g., an explicit request from a user or driver), or automatically when the driver or vehicle 101 approaches a target destination (e.g., a set destination, an inferred destination, and/or any other known destination). In yet another embodiment, the vehicle 101 and/or UE 113 can initiate a request for parking duration or availability data for links of interest when the vehicle 101 is detected to have initiated a parking search (e.g., by creating location traces or trajectory data indicating circling, slowing down, multiple U-turns, etc. within an area of the destination). In this way, the parking occupancy data can be provided even when no destination is set or known by the system 100.

In one embodiment, the vehicle 101 and/or UE 113 are configured to report probe data as probe points, which are individual data records that record telemetry data collected at a point in time. In one embodiment, a probe point can include attributes such as a heading, a speed, a time, or a combination thereof of each of the plurality of devices. At least some of these attributes can also be used as classification features. It is contemplated that any combination of these attributes or other attributes may be used to determine the vehicle 101's parking behavior. As previously discussed, the vehicle 101 may include sensors for reporting measurements and/or reporting attributes associated with parking behavior. The attributes can also be any attribute normally collected by an on-board diagnostic (OBD) system of the vehicle, and available through an interface to the OBD system (e.g., OBD II interface or other similar interface). These attributes can be activation of backup sensors, steering angle, activation of brakes, etc. that can potentially be indicative of parking-related behavior.

In one embodiment, the parking platform 103, the vehicles 101, and/or the UE 113 can interact with a service platform 119, one or more services 121*a*-121*j* (also collectively referred to as services 121), one or more content providers 123*a*-123*k* (also collectively referred to as content providers 123), or a combination thereof over communication network 125 to provide functions and/or services based on the parking occupancy model created according to the various embodiments described herein. The service platform 119, services 121, and/or content providers 123 may provide anonymized parking data, as well as provide mapping, navigation, and/or other location based services to the vehicle 101 and/or UE 113.

By way of example, the UE 113 may be any mobile computer including, but not limited to, an in-vehicle navigation system, vehicle telemetry device or sensor, a personal navigation device ("PND"), a portable navigation device, a cellular telephone, a mobile phone, a personal digital assistant ("PDA"), a wearable device, a camera, a computer and/or other device that can perform navigation or location based functions, i.e., digital routing and map display. In some embodiments, it is contemplated that mobile computer can refer to a combination of devices such as a cellular telephone that is interfaced with an on-board navigation system of an autonomous vehicle or physically connected to the vehicle for serving as the navigation system.

By way of example, the parking platform 103 may be implemented as a cloud based service, hosted solution or the like for performing the above described functions. Alternatively, the parking platform 103 may be directly integrated for processing data generated and/or provided by the service platform 119, services 121, content providers 123, and/or applications 117. Per this integration, the parking platform 103 may perform client-side measurement of parking duration from anonymized parking data.

By way of example, the communication network 105 of system 100 includes one or more networks such as a data network, a wireless network, a telephony network, or any combination thereof. It is contemplated that the data network may be any local area network (LAIN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the parking platform 103 communicates with other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 4:
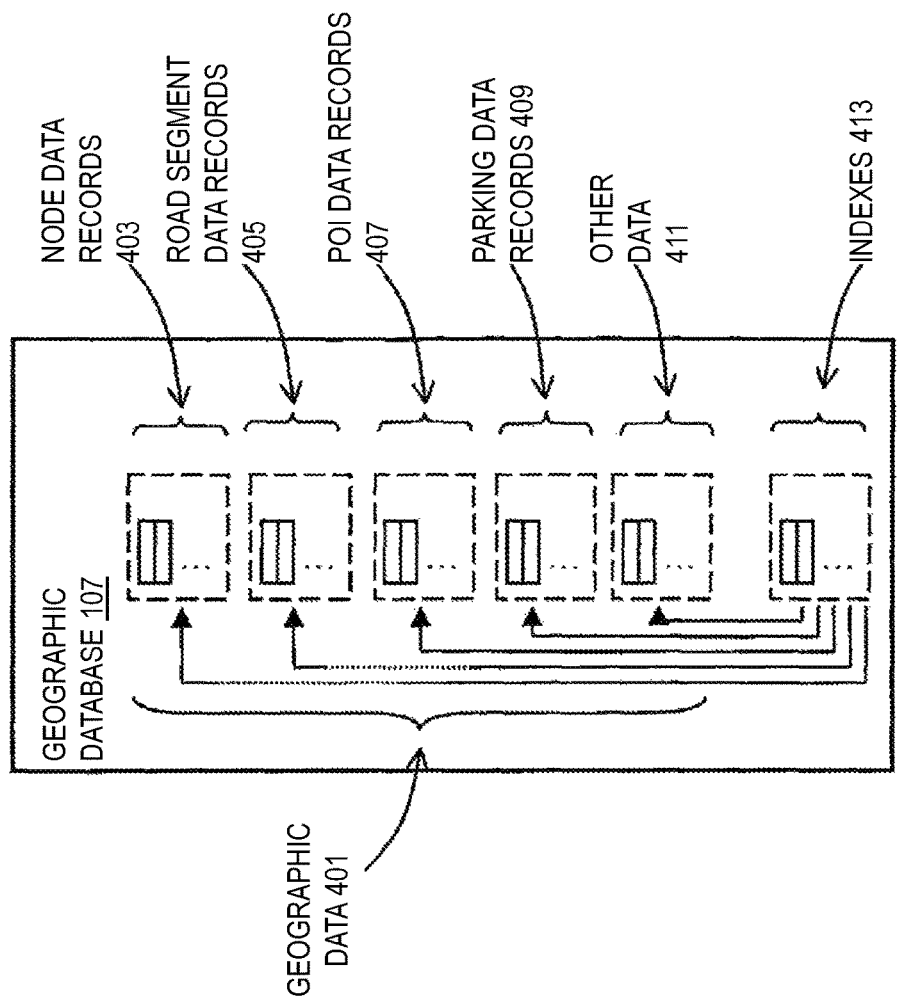
FIG. 4 is a diagram of a geographic database, according to one embodiment.

FIG. 4 is a diagram of the geographic database 107, according to one embodiment. In one embodiment, parking duration data, parking availability information, anonymized parking data, and/or any other information used or generated by the system 100 can be stored, associated with, and/or linked to the geographic database 107 or data thereof. In one embodiment, the geographic or map database 107 includes geographic data 401 used for (or configured to be compiled to be used for) mapping and/or navigation-related services, such as for route information, service information, estimated time of arrival information, location sharing information, speed sharing information, and/or geospatial information sharing, according to exemplary embodiments. For example, the geographic database 107 includes node data records 403, road segment or link data records 405, point of interest (POI) data records 407, parking data records 409, other data records 411, and indexes 413. More, fewer or different data records can be provided.

In one embodiment, these records store one or more of the data, parameters, and/or other map features used for measuring parking duration from anonymized data according to the various embodiments described herein. As described above, the features include, but are not limited to: (1) functional class of the link (e.g., principal arterial roadways, minor arterial roadways, collector roadways, local roadways, etc.); (2) POI density along a link (e.g., how many POIs are located along the link); (3) night life POI density along a link (e.g., how many POIs classified related to night life are along the link, such as restaurants, bars, clubs, etc.); (4) POI types along a link (e.g., what other types of POIs are located along the link); (5) population density along a link (e.g., the population of people living or working areas around the link); (6) road density along a link (e.g., how many roads are within a threshold distance of the link); (7) zoning (e.g., CBD, residential, etc.); (8) time epoch (e.g., segmentation by a defined period of time such as 15 mins, 1 hour, etc. periods of time); (9) weekday/weekend; (10) bi-directionality (e.g., whether traffic flows in two or multiple directions along the link); and (11) accessibility to public transit (e.g., proximity to subways, buses, transit stations, etc.).

In one embodiment, the other data records 411 include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example.

In one embodiment, the indexes 413 may improve the speed of data retrieval operations in the geographic database 107. In one embodiment, the indexes 413 may be used to quickly locate data without having to search every row in the geographic database 107 every time it is accessed.

In exemplary embodiments, the road segment data records 405 are links or segments representing roads, streets, or paths, as can be used in the calculated route or recorded route information. The node data records 403 are end points corresponding to the respective links or segments of the road segment data records 405. The road link data records 405 and the node data records 403 represent a road network, such as used by vehicles, cars, and/or other entities. Alternatively, the geographic database 107 can contain path segment and node data records or other data that represent pedestrian paths or areas in addition to or instead of the vehicle road record data, for example.

The road link and nodes can be associated with attributes, such as geographic coordinates, street names, address ranges, speed limits, turn restrictions at intersections, and other navigation related attributes, as well as POIs, such as traffic controls (e.g., stoplights, stop signs, crossings, etc.), gasoline stations, hotels, restaurants, museums, stadiums, offices, automobile dealerships, auto repair shops, buildings, stores, parks, etc. The geographic database 107 can include data about the POIs and their respective locations in the POI data records 407. The geographic database 107 can also include data about places, such as cities, towns, or other communities, and other geographic features, such as bodies of water, mountain ranges, etc. Such place or feature data can be part of the POI data 407 or can be associated with POIs or POI data records 407 (such as a data point used for displaying or representing a position of a city).

In one embodiment, the parking data records 409 can include any data item used by the parking platform 103 including, but not limited to historical or predicted parking duration data, parking availability/occupancy data, link categories or clusters, parking occupancy patterns or templates associated with the clusters or link categories, parking duration models, parking data, travel segments within the parking areas to monitor, number of spaces, parking search behaviors, probe or trajectory data, travel profile information, user preferences, and/or the like.

The geographic database 107 can be maintained by the content provider in association with the service platform 119 (e.g., a map developer). The map developer can collect geographic data 401 to generate and enhance the geographic database 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The geographic database 107 can be a master geographic database stored in a format that facilitates updating, maintenance, and development. For example, the master geographic database 107 or data 401 in the master geographic database 107 can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems (e.g., associated with the vehicles 101 and/or UE 113).

For example, geographic data 401 or geospatial information is compiled (such as into a platform specification format (PSF)) to organize and/or configure the data for performing map or navigation-related functions and/or services, such as map annotation, route calculation, route guidance, map display, speed calculation, distance and travel time functions, and other functions, by a navigation device, such as by a vehicle 101 and/or UE 113 (e.g., via a navigation application 117). The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

As mentioned above, the geographic database 107 can be a master geographic database, but in alternate embodiments, the geographic database 107 can represent a compiled navigation database that can be used in or with end user devices (e.g., the vehicles 101 and/or UEs 113) to provide navigation-related functions including estimations of parking availability and waiting times to park in various parking areas. For example, the geographic database 107 can be used with the end user device (e.g., vehicle 101 and/or UE 113) to provide an end user with navigation and parking-related features. In such a case, the geographic database 107 and/or its related parking data/information can be downloaded or stored on the end user device, or the end user device can access the geographic database 107 through a wireless or wired connection (such as via a server and/or the communication network 105), for example.

Figure 5:
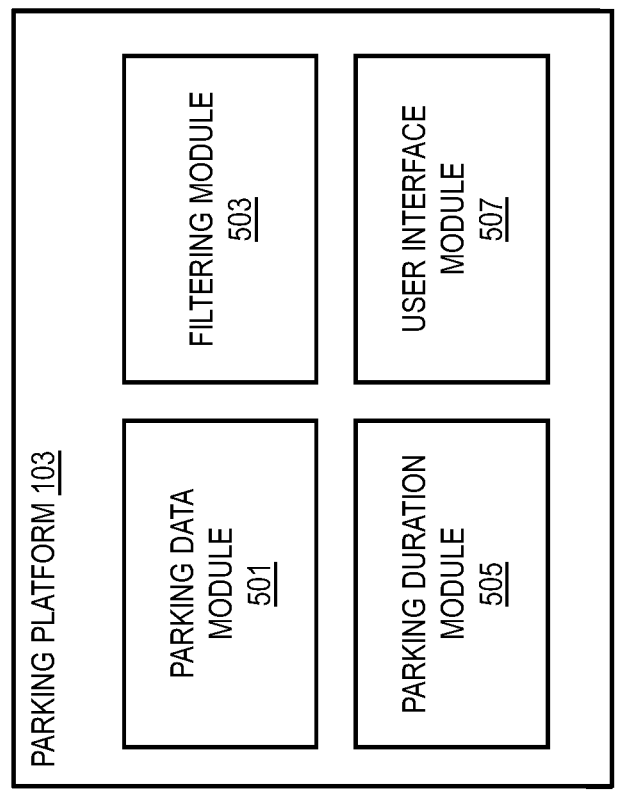
FIG. 5 is a diagram of the components of a parking platform, according to one embodiment.

FIG. 5 is a diagram of the components of a parking platform 103, according to one embodiment. By way of example, the parking platform 103 includes one or more components for measuring parking duration from anonymized according to the various embodiments described herein. It is contemplated that the functions of these components may be combined or performed by other components of equivalent functionality. In this embodiment, the parking platform 103 includes a parking data module 501, a filtering module 503, a parking duration module 505, and a user interface (UI) module 507. The above presented modules and components of the parking platform 103 can be implemented in hardware, firmware, software, or a combination thereof. Though depicted as a separate entity in FIG. 1, it is contemplated that the parking platform 103 may be implemented as a module of any of the components of the system 100 (e.g., a component of the vehicle 101, navigation system of the vehicle 101, UE 113, and/or application 117). In another embodiment, one or more of the modules 501-507 may be implemented as a cloud based service, local service, native application, or combination thereof. The functions of these modules are discussed with respect to FIGS. 6-8 below.

Figure 6:
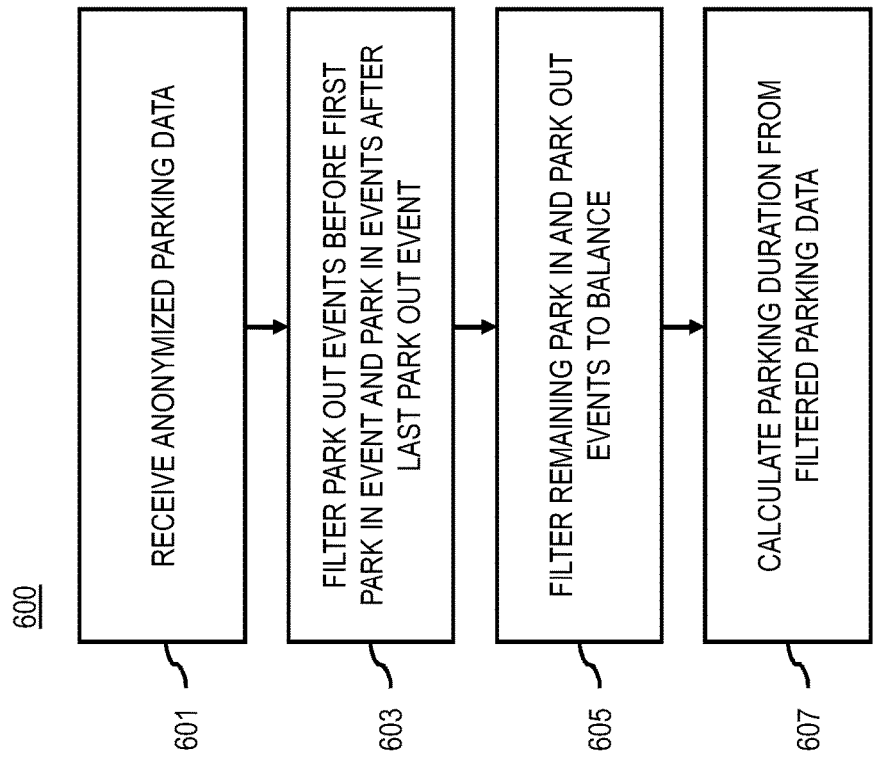
FIG. 6 is a flowchart of a process for measuring parking duration data from anonymized data, according to one embodiment.
Figure 11:
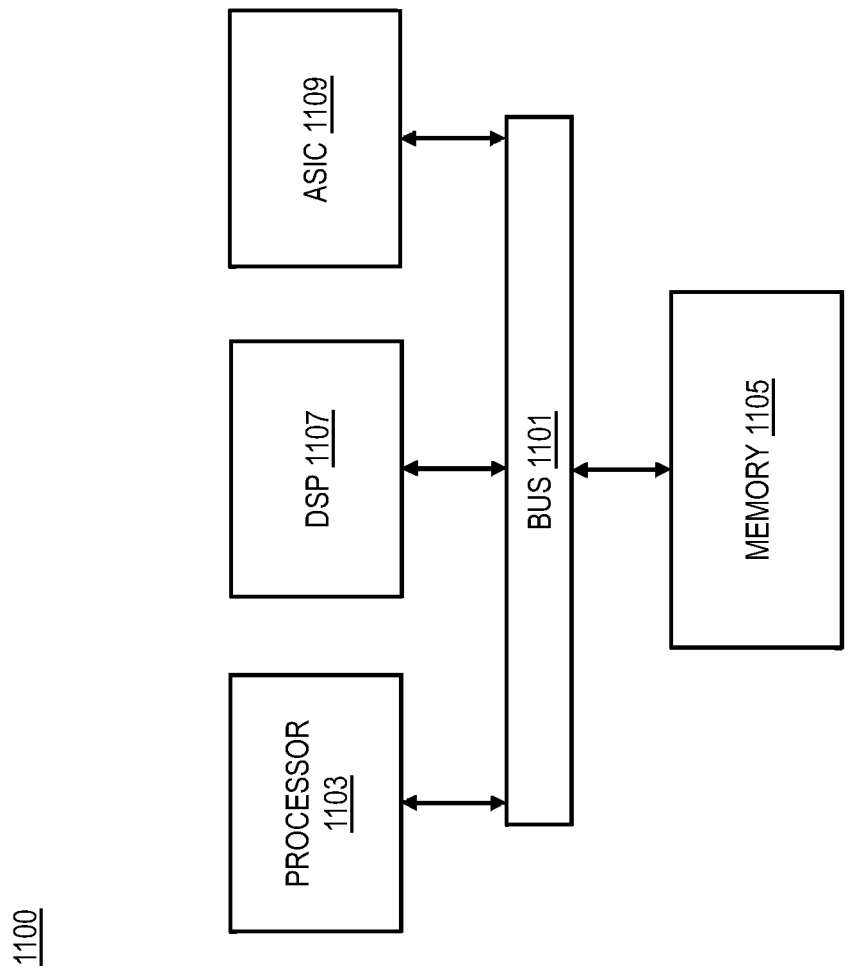
FIG. 11 is a diagram of a chip set that can be used to implement an embodiment.

FIG. 6 is a flowchart of a process for measuring parking duration data from anonymized data, according to one embodiment. In various embodiments, the parking platform 103 and/or any of the modules 501-507 of the parking platform 103 as shown in FIG. 5 may perform one or more portions of the process 600 and may be implemented in, for instance, a chip set including a processor and a memory as shown in FIG. 11. As such, the parking platform 103 and/or any of the modules 501-507 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all of the illustrated steps.

In step 601, the parking data module 501 receives parking data from a plurality of connected vehicles. In one embodiment, the parking data indicate park in events, park out events, or a combination thereof that are not associated with each other to anonymize the parking data as previously described. By way of example, a park in event is a record indicating that a vehicle 101 has parked in a parking space 109 located in a parking area 106 (e.g., a street or road segment, parking garage, parking lot, or other parking facility). A park out event is a record indicating that a vehicle 101 has vacated a parking space 109. In the case of anonymized parking data, there is no association between a park in event and its corresponding park out event for an individual parking event, thereby making a traditional parking calculation impossible. Accordingly, the parking platform 103 uses the filtering-based processes for measuring parking duration data from anonymized data according to the various embodiments described herein.

In step 603, the filtering module 503 performs a first filtering of the parking data to remove the park out events that occur within a time interval and that occur before a first one of the park in events occurring within the time interval, and to remove the park in events that occur within the time interval and that occur after a last one of the park out events that occur within the time interval. As previously described, the time interval can be any period of time for which parking duration is to be calculated. For example, to determine parking duration occurring in 1-day chunks, the time interval can be set to 1-day (e.g., midnight to midnight). It is contemplated that the time interval can be set to any period of time (e.g., hours, days, weeks, months, seasons, years, etc.) beginning with a time T0 and ending at a time T1.

In step 605, the filtering module 503 performs a second filtering of the parking data remaining after the first filtering to remove one or more of the park in events or one or more of the park out events so that a number of the park in events is balanced with a number of the park out events. In other words, the second filtering balances the number of remaining park in events so that it matches the number of remaining park out events. It is contemplated that the filtering module 503 can use any means to balance the park in and park out events. One example includes, but is not limited to, the example second filtering process described with respect to FIG. 7 below. Other examples can include simply counting the numbers of park in and park out events, and removing random park in or park out events until the numbers match. This second filtering step, for instance, advantageously removes park in and/or park out events that correspond to parking events that begin or end outside of the time interval of interest that were not otherwise filtered in the first filtering step.

In step 607, the parking duration module 505 calculates parking duration data from the park in events and the park out events remaining after the second filtering. In one embodiment, the parking duration data represents an average parking duration for the plurality of vehicles within the time interval. One example of determining average parking duration from time stamps for park in and park out events is the average parking duration equation (1) described above.

In one embodiment, after generating the parking duration information, the user interface module 507 can then present the information via an end user device (e.g., navigation system of the vehicle 101, UE 113, navigation application 117, etc.). In addition or alternatively, the user interface module 507 can interact with other services, applications, models, etc. that rely on parking duration data (e.g., the service platform 119 and/or services 121) by providing the generated parking duration data (e.g., via an application programming interface (API) or other equivalent means). For example, these additional services, applications, models, etc. can use the generated parking duration data to determine parking occupancy or availability data, park out rates, park in rates, etc. as further described with respect to FIG. 8 below.

Figure 7:
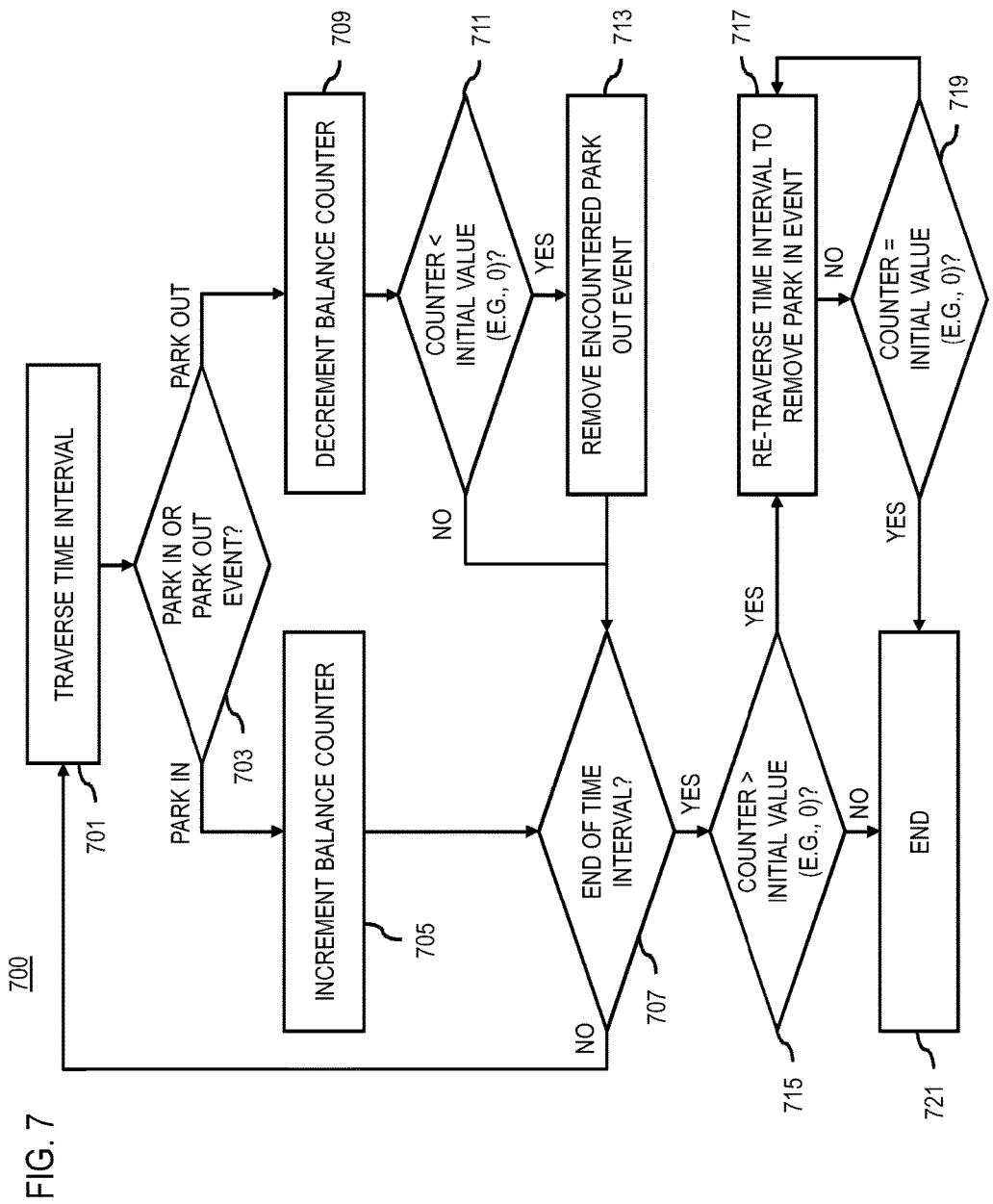
FIG. 7 is a flowchart of a process for filtering parking data to balance park in and park out events, according to one embodiment.

FIG. 7 is a flowchart of a process for filtering parking data to balance park in and park out events, according to one embodiment. In various embodiments, the parking platform 103 and/or any of the modules 501-507 of the parking platform 103 as shown in FIG. 5 may perform one or more portions of the process 700 and may be implemented in, for instance, a chip set including a processor and a memory as shown in FIG. 11. As such, the parking platform 103 and/or any of the modules 501-507 can provide means for accomplishing various parts of the process 700, as well as means for accomplishing embodiments of other processes described herein in conjunction with other components of the system 100. Although the process 700 is illustrated and described as a sequence of steps, its contemplated that various embodiments of the process 700 may be performed in any order or combination and need not include all of the illustrated steps.

The process 700 is one example embodiment of the second filtering process described at step 607 of FIG. 6 above. The process 700 is provided by way of illustration and is not intended as a limitation. Any equivalent means for balancing the number of park in and park out events remaining after the first filtering step 603 of FIG. 6 can be used.

In step 701, the filtering module 503 traverses the time interval. In one embodiment, the traversing of the time interval is in a forward time direction (e.g., from T0 to T1 of the time interval 203). For example, traversing the time interval includes sorting the park in and park events occurring in the time interval according to time. Then, beginning from T0, the filtering module 503 processes each time-sorted event in a chronological order.

In step 703, the filtering module 503 determines whether it has encountered a park in or a park out event in the time interval. When a park in event is encountered in the time interval, the filtering module 503 increments a balance counter by one (step 705). In one embodiment, the balance counter is initialized with a value of zero or any other initial value specified by the parking platform 103. If the end of the time interval has not been reached (step 707), the filtering module 503 returns to step 701 to continue traversing the time interval.

When a park out event is encountered in the time interval, the filtering module 503 decrements the balance counter by one (step 709). When the decrementing of the balance counter would result in the balance counter being less than the initial value of the balance counter (e.g., BC<0) (step 711), the filtering module 503 removes the encountered park out event from the parking data (step 713). By way of example, the system 100 begins by removing park out events first from the beginning of the time interval, because it is more likely that excess park out events occurring early in the time interval would have a corresponding park in event that occurred before the beginning of the time interval (e.g., before T0). If the end of the time interval has not been reached (step 707), the filtering module 503 returns to step 701 to continue traversing the time interval.

If the end of the time interval is reached, the filtering module determines whether the balance counter is greater than the initial value (e.g., BC>0) (step 715). A balance counter greater than 0 or other initial value indicates that there are more park in events than park out events remaining. Accordingly, the filtering module 503 re-traverses the time interval to remove excess park in events. In one embodiment, the re-traversing of the time interval is a reverse time direction (e.g., from T1 to T0 of the time interval 203). During the re-traversing, when a park in event is encountered, removing the encountered park in event from the parking data and decrementing balance counter (step 717) until the balance counter equals the initial value (step 719). By way of example, in one embodiment, the system 100 removes excess park in events occurring later in the time interval first because these park in events are more likely to have corresponding park out events occurring after the end of the time interval (e.g., after T1). Once the balance counter equals zero, the filtering module 503 ends the filtering process.

Figure 8:
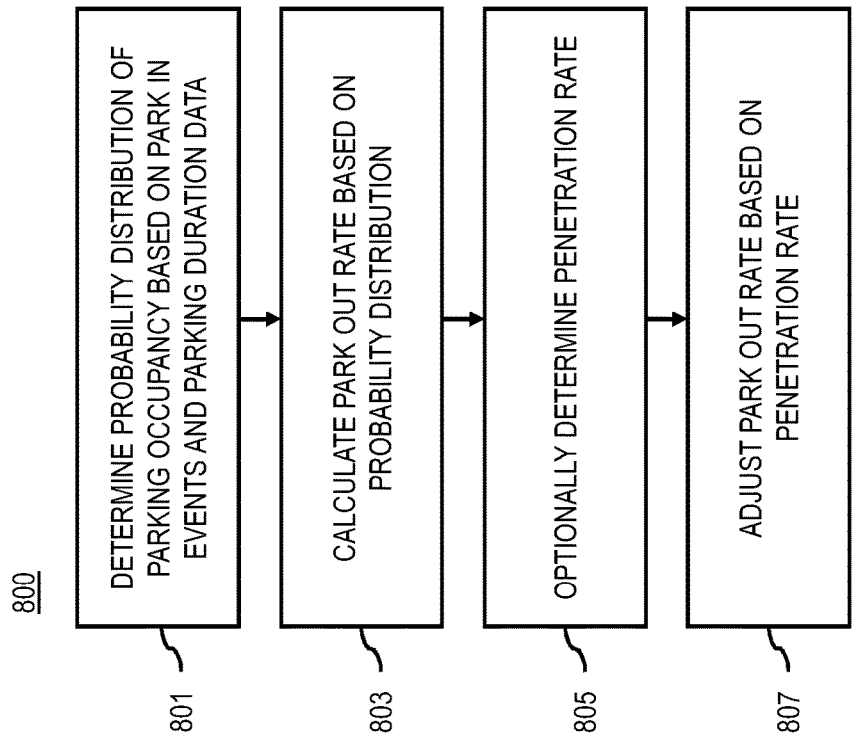
FIG. 8 is a flowchart of a process for determining a park out rate from parking duration data, according to one embodiment.

FIG. 8 is a flowchart of a process for determining a park out rate from parking duration data, according to one embodiment. In various embodiments, the parking platform 103 and/or any of the modules 501-507 of the parking platform 103 as shown in FIG. 5 may perform one or more portions of the process 800 and may be implemented in, for instance, a chip set including a processor and a memory as shown in FIG. 11. As such, the parking platform 103 and/or any of the modules 501-507 can provide means for accomplishing various parts of the process 800, as well as means for accomplishing embodiments of other processes described herein in conjunction with other components of the system 100. Although the process 800 is illustrated and described as a sequence of steps, its contemplated that various embodiments of the process 800 may be performed in any order or combination and need not include all of the illustrated steps.

In one embodiment, the process 800 provides an example use case of one application of the parking duration data measure or generated by the parking platform 103 according to the various embodiments described herein. In the example of FIG. 8, parameters such as parking occupancy/availability and/or park out rate can be determined from the measured parking duration data.

In step 801, the parking duration module 505 determines a probability distribution of parking occupancy for a parking area occupied by the plurality of vehicles as a function of time based on the park in events and the parking duration data. In other words, a parking occupancy model can use a parking duration d (e.g., measured from anonymized data according to the various embodiments described herein) to predict the parking occupancy probability distribution:

$P_{occ}(t)$=Probability distribution of occupancy as a function of time.

In step 803, the parking duration module 505 calculates a park out rate for the parking area based on the probability distribution. For example, the park out rate $\mu_j$ for a given occupancy j is $\mu_j$=j/d. In other words, for each vehicle 101 that is parked, there is a rate 1/d of that vehicle 101 leaving. The overall rate of vehicles 101 leaving is then j/d. In one embodiment, the park out rate is a mean park out rate, a distribution of the park out rate, or a combination thereof. For example, the parking duration module 505 can calculate the mean park out rate predicted by the model by computing a probability-weighted average of $\mu_j$.

In one embodiment, a distribution of the park out rate (as opposed to a mean park out rate), for instance, represents a number of the park out events per epoch per day. For example, if there are 500 days of parking data, then the parking duration module 505 can make a histogram with 500 entries. To generate the distribution of the park out rate, the parking duration module 505 uses the model to predict the park out rate for each occupancy state, as described above. The predicted park out rate can then be used as a mean of a Poisson distribution. For example, this distribution provides the number of counts expected per day in the total population. For each occupancy state, the parking duration module 505 combines the respective Poisson distribution into one distribution by making a probability-weighted sum of distributions.

In step 805, the parking duration module 505 optionally determines a penetration rate for the plurality of connected vehicles. In one embodiment, the penetration rate represents a proportion of the connected vehicles to all vehicles parked in the parking area. For example, if the connected vehicles are part of one OEM parking data network, the reported parking data then only the portion of all parking data corresponding to the market share or penetration of the vehicles from that OEM. In one embodiment, the penetration rate can be a parameter provided by the OEM or other service provider.

In step 807, the parking duration module 505 adjusts or further calculates the park out rate (e.g., both mean and distribution park out rates) based on the penetration rate. This adjustment, for instance, enable cross-OEM or cross-service provider comparisons. In one embodiment, the adjustment for a mean park out rate is (park out rate)× (penetration rate). To correct for penetration with respect to park out rate distributions, the parking duration module 505, for instance, can use a binomial with probability $p_{est}$ to get the distribution of number of counts expected to be observed after taking penetration into account.

In one embodiment, the parking platform 103 can also estimate parking occupancy form parking duration data as follows. For example, park in and park out events are collected and aggregated. They are sliced into subsamples defined by bins of time. If parking occupancy is expected to be the same on each weekday, the parking platform 103 can use park in and park out events from weekdays only. Then, the parking platform 103 aggregates the data in, for example, 30 minute wide (or any other time period) slices. In each slice, the parking platform 103 counts the number of park in events. The parking platform 103 also measures the average parking duration according to the various embodiments described herein. The result of this process is two historical patterns derived from the parking data:

(1) park in rate as a function of time of day: $\lambda_0(t)$ (unit: park in events/minute); and
(2) average parking duration as a function of time of day: d(t) (unit: minutes).

In one embodiment, one complication is that the parking platform 103 may receive data from only a fraction f of the vehicles 101 on the road (e.g., penetration rate). The penetration rate can be estimated from any source (e.g., vehicle OEMs may be able to provide estimates of this penetration rate based on the market penetration in an area). The parking platform 103 can then compute the total park in rate as a function of the time of day: $\lambda'(t)=\lambda_0(t)/f$.

In one embodiment, the parking platform can then use $\lambda'(t)$ and d(t) to build a historical model for parking occupancy as a function of time. For example, the parking platform 103 can use queueing theory to describe the model for parking occupancy as an M/M/s/K queue, where s=K and K is the total number of parking spaces 109 in the parking area 106 of interest. In one embodiment, this system or model is a continuous time Markov process, where the states of the Markov process are the number of occupied parking spaces. The Markov chain has a generator matrix Q given by:

$$q_{ij} = \begin{cases} \lambda(t) & \text{if } j = i+1 \text{ and } i < K \\ i\mu(t) & \text{if } j = i-1 \text{ and } 0 < i \le K \\ -\min(1, K-i)\lambda(t) - \min(i, K)\mu & \text{if } j = i \\ 0 & \text{otherwise} \end{cases},$$

where u(t)=1/d(t).

In one embodiment, this generator matrix enables the parking platform 103 to compute the time evolution of the probability of the occupancy as follows:

$$P(X(t+\tau)=j|X(\tau)=i)=[\exp(Qt)]_{ij}. \tag{2}$$

The result of this expression is matrix giving the probability of being in state j at time t+τ, given the probability of being in state i at time τ.

In one embodiment, the number of occupied spaces at time t is described by a probability distribution P(t). By way of example, the parking platform 103 can choose a starting distribution P(t=0). The parking platform 103 can choose any uniform distribution as the starting distribution such as a uniform distribution. It is noted that the uniform distribution is provided by way of illustration and not as a limitation. Any other uniform distribution can be used or selected based, for instance, on knowledge of the state of parking at a given time.

The parking platform 103 can then use equation (2) above to compute how the probability distribution evolves in time. Based on this computation, the parking platform 103 can update P by multiplying each of the elements of P by the appropriate matrix elements. For example, if $P(t=t_0)=(s_0, s_1, s_2, s_3)$, then $P(t=t0+\tau)=(\Sigma_i s_i P_{i0}, \Sigma_i s_i P_{i1}, \Sigma_i s_i P_{i2}, \Sigma_i s_i P_{i3})$, which is the case for an example with three total parking spaces.

In one embodiment, the process above depends on knowing the total arrival rate λ(t), which includes vehicles 101 that arrive in a parking area 106 looking for parking and fail to find it, while the parking platform 103 measures the park in rate λ'(t), which does not include vehicles that fail to find parking. To correct for this, it is observed that the total arrival rate λ(t) is related to the observed park in rate λ'(t):

$$\lambda = \lambda'/(1 - \mathcal{P}_{full}). \tag{3}$$

$\mathcal{P}_{full}$ is the probability for parking to be full (e.g., the bin of the probability distribution P(t) corresponding to occupancy K. Based on equation (3), if the parking is never full in the parking area 106, then an arriving driver never fails to find parking and λ=λ'. Along the same lines, if the parking is full half the time, then half of the arriving vehicles 101 will fail to find parking and the park in rate λ' will be half as big as the arrival rate λ.

As a result, equation (3) can be rewritten as:

$$\mathcal{P}_{full} = 1 - \lambda'/\lambda \tag{4}$$

Equation (2) also gives means to calculate $P_{full}$ as a function of the unknown quantity λ. Therefore, there are at least two equations for $P_{full}$ as a function of λ. This then provides means for solving for λ by setting equation (2) equal to equation (4). Once the value of λ is known, the parking platform 103 can use equation (2) to compute the full probability distribution for the next point in time. This process is repeated for each interval of time to find the compute evolution of P(t) over the course of a day. Therefore, the parking availability or occupancy can be determined from the parking duration data measured from anonymized data according to the various embodiments described herein.

In summary, the parking platform 103 can determine a parking occupancy/availability model as follows:
(1) measure the park in rate λ'(t) (optionally correct for penetration rate);
(2) measure the average parking duration d(t) (e.g., from anonymized parking data according to the various embodiments described herein);
(3) choose a starting probability distribution P(t=0);
(4) solve the system of equations given by equations (2) and (4), computed using λ' (t) and d(t), to determine P at t+τ; and
(5) repeat step above for subsequent time steps until the complete parking occupancy/availability pattern is generated.

Figure 9:
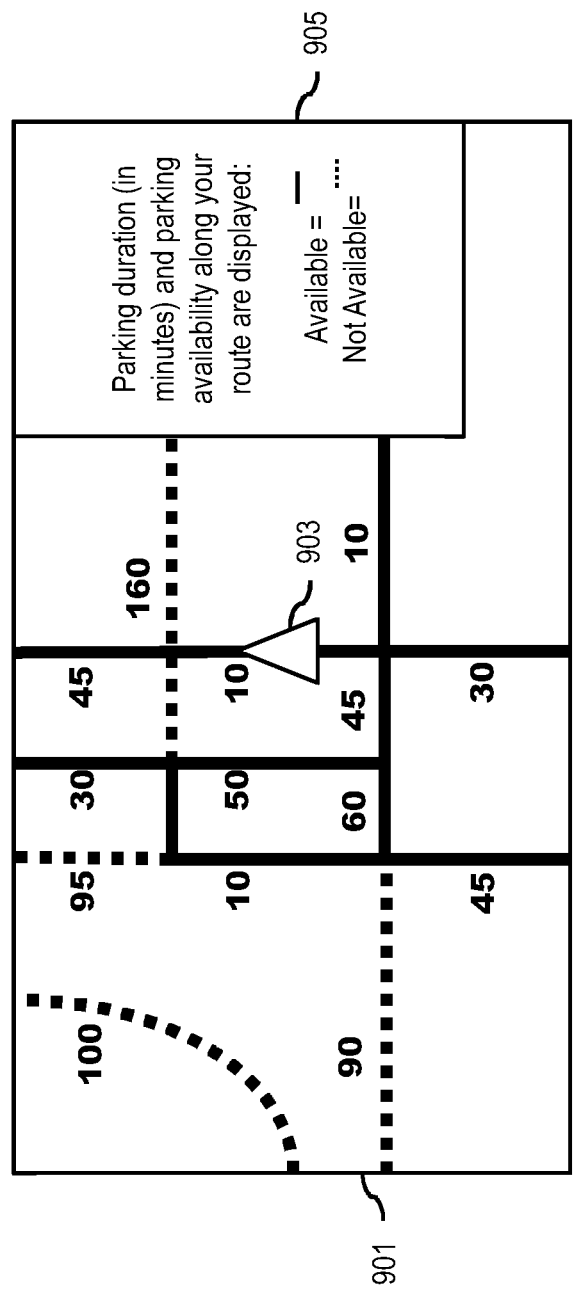
FIG. 9 is a diagram of an example navigation user interface presenting parking duration data measured from anonymized data, according to one embodiment.

FIG. 9 is a diagram of an example navigation user interface presenting parking duration data measured from anonymized data, according to one embodiment. As shown, a UI 901 depicts a navigation user interface (e.g., presented on vehicle 101 and/or UE 113) for a user traveling in a road network. The UI 901 presents a representation of a current user position 903 overlaid on a map display of the road network. As indicated in window 905, the map display presents representations of parking duration data (e.g., generated from anonymized parking data according to the various embodiments described herein) and parking availability data (e.g., predicted from the generated parking duration data) with respect to road links of the road network. In one embodiment, as the vehicle 101 travels, the parking platform 103 can measure parking duration data from anonymized parking data received from vehicles parking along the road links. The parking platform 103 can then use the parking duration data to predict parking availability information (e.g., using the processes described above) for the road links within a predetermined proximity of the vehicle 101. As shown in the UI 901, road links with available parking are indicated by a solid line, and road links on which is not available are indicated with a dotted line. Next to each road link, the UI 901 presents the measured parking duration (e.g., in minutes) to the user.

The processes described herein for measuring parking duration data from anonymized data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
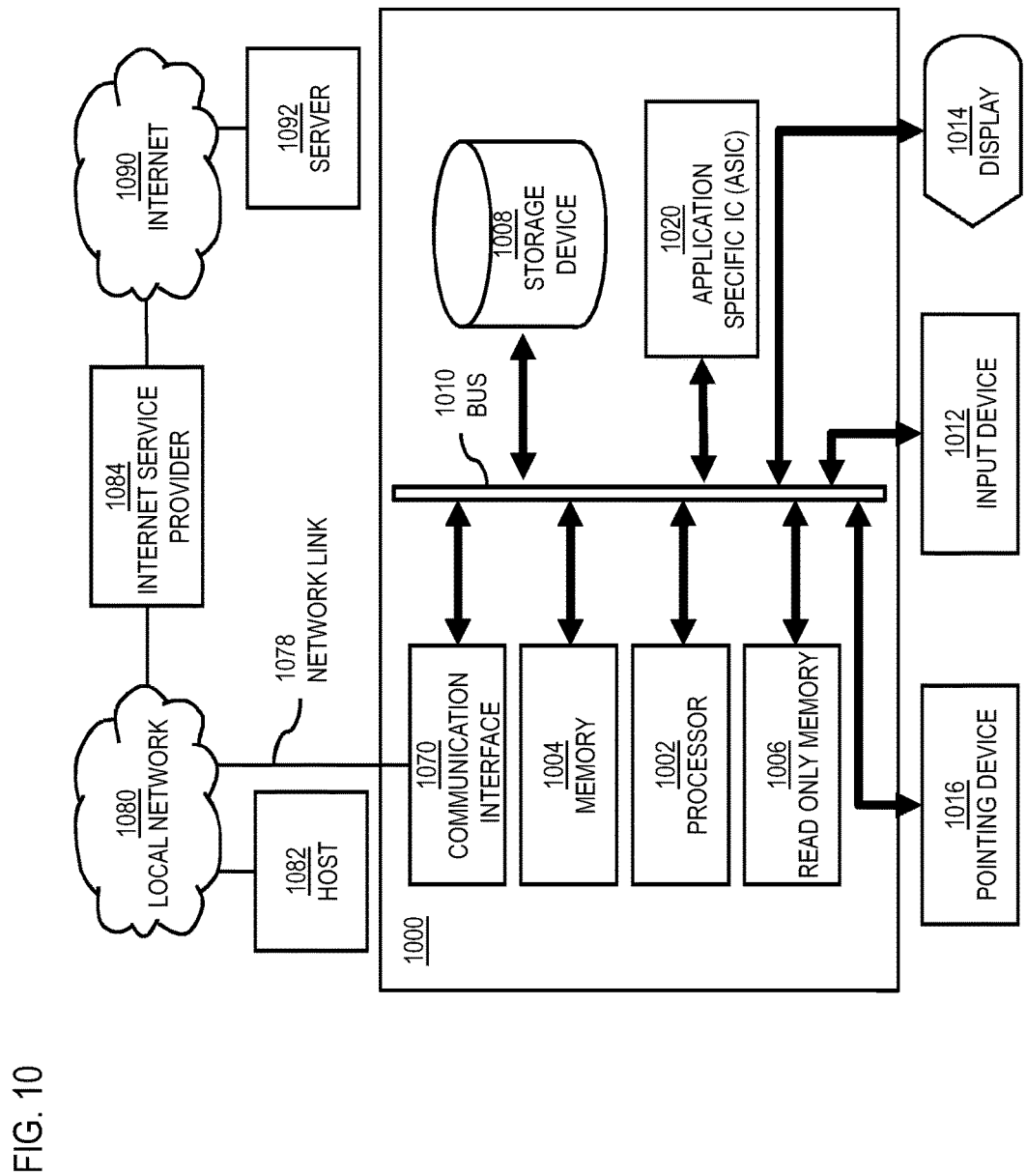
FIG. 10 is a diagram of hardware that can be used to implement an embodiment.

FIG. 10 illustrates a computer system 1000 upon which an embodiment of the invention may be implemented. Computer system 1000 is programmed (e.g., via computer program code or instructions) to measure parking duration data from anonymized data as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1010 includes one or more parallel conductors of information so that information is transferred quickly among devices coupled to the bus 1010. One or more processors 1002 for processing information are coupled with the bus 1010.

A processor 1002 performs a set of operations on information as specified by computer program code related to measuring parking duration data from anonymized data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1000 also includes a memory 1004 coupled to bus 1010. The memory 1004, such as a random access memory (RAM) or other dynamic storage device, stores information including processor instructions for measuring parking duration data from anonymized data. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for measuring parking duration data from anonymized data, is provided to the bus 1010 for use by the processor from an external input device 1012, such as a keyboard containing alphanumeric keys operated by a human user, or a sensor. A sensor detects conditions in its vicinity and transforms those detections into a physical expression compatible with the measurable phenomenon used to represent information in computer system 1000. Other external devices coupled to bus 1010, used primarily for interacting with humans, include a display device 1014, such as a cathode ray tube (CRT) or a liquid crystal display (LCD), or plasma screen or printer for presenting text or images, and a pointing device 1016, such as a mouse or a trackball or cursor direction keys, or motion sensor, for controlling a position of a small cursor image presented on the display 1014 and issuing commands associated with graphical elements presented on the display 1014. In some embodiments, for example, in embodiments in which the computer system 1000 performs all functions automatically without human input, one or more of external input device 1012, display device 1014 and pointing device 1016 is omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of application specific ICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 105 for measuring parking duration data from anonymized data.

The term computer-readable medium is used herein to refer to any medium that participates in providing information to processor 1002, including instructions for execution. Such a medium may take many forms, including, but not limited to, non-volatile media, volatile media and transmission media. Non-volatile media include, for example, optical or magnetic disks, such as storage device 1008. Volatile media include, for example, dynamic memory 1004. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 11 illustrates a chip set 1100 upon which an embodiment of the invention may be implemented. Chip set 1100 is programmed to measure parking duration data from anonymized data as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to measure parking duration data from anonymized data. The memory 1105 also stores the data associated with or generated by the execution of the inventive steps.

Figure 12:
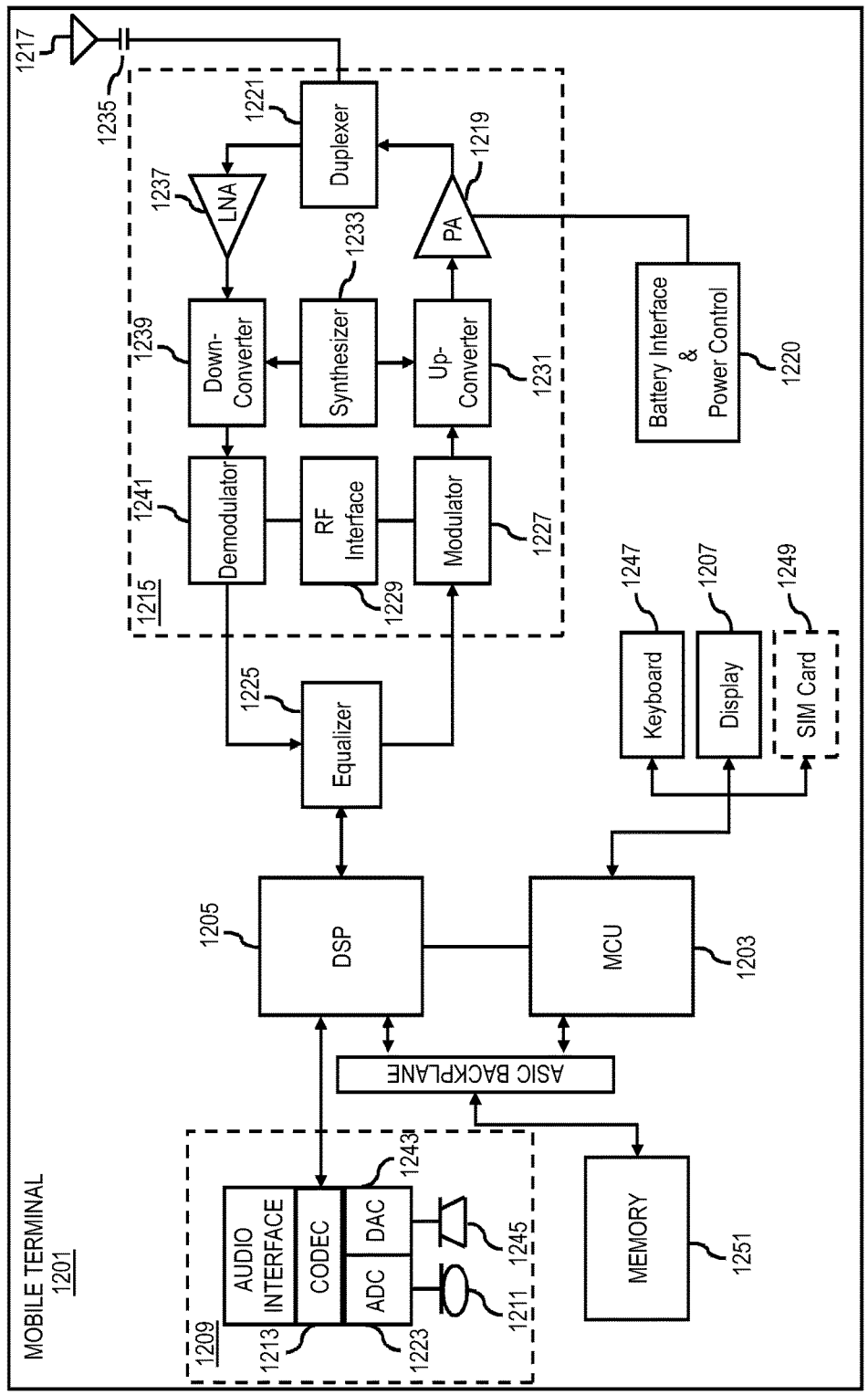
FIG. 12 is a diagram of a mobile terminal (e.g., mobile computer) that can be used to implement an embodiment.

FIG. 12 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile station functions that offer automatic contact matching. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile station 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203—which can be implemented as a Central Processing Unit (CPU) (not shown).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile station 1201 to measure parking duration data from anonymized data. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the station. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile station 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1251 may be, but not limited to, a single memory, CD, DVD, ROM, RAM, EEPROM, optical storage, or any other non-volatile or non-transitory storage medium capable of storing digital data.

An optionally incorporated SIM card 1249 carries, for instance, important information, such as the cellular phone number, the carrier supplying service, subscription details, and security information. The SIM card 1249 serves primarily to identify the mobile station 1201 on a radio network.

The card 1249 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving parking data from a plurality of connected vehicles, wherein the parking data indicate park in events, park out events, or a combination thereof that are not associated with each other to anonymize the parking data;
   performing a first filtering of the parking data to remove the park out events that occur within a time interval and that occur before a first one of the park in events occurring within the time interval, and to remove the park in events that occur within the time interval and that occur after a last one of the park out events that occur within the time interval;
   performing a second filtering of the parking data remaining after the first filtering to remove one or more of the park in events or one or more of the park out events so that a number of the park in events is balanced with a number of the park out events; and
   calculating parking duration data from the park in events and the park out events remaining after the second filtering.

2. The method of claim 1, wherein the second filtering comprises:
   traversing the time interval;
   when a park in event is encountered in the time interval, incrementing a balance counter by one;
   when a park out event is encountered in the time interval, decrementing the balance counter by one; and
   removing the encountered park out event from the parking data when the balance counter would be decremented below an initial value of the balance counter.

3. The method of claim 2, wherein the second filtering further comprises:
   when the balance counter is greater than the initial value after the traversing of the time interval, re-traversing the time interval; and
   when a park in event is encountered, removing the encountered park in event from the parking data and decrementing the balance counter until the balance counter equals the initial value.

4. The method of claim 3, wherein the traversing of the time interval is in a forward time direction, and wherein the re-traversing of the time interval is in a reverse time direction.

5. The method of claim 1, wherein the parking duration data represents an average parking duration for the plurality of vehicles within the time interval.

6. The method of claim 1, further comprising:
   determining a probability distribution of parking occupancy for a parking area occupied by the plurality of vehicles as a function of time based on the park in events and the parking duration data; and
   calculating a park out rate for the parking area based on the probability distribution.

7. The method of claim 6, further comprising:
determining a penetration rate for the plurality of connected vehicles,
wherein the penetration rate represents a proportion of the connected vehicles to all vehicles parked in the parking area; and
wherein the park out rate is further based on the penetration rate.

8. The method of claim 6, wherein the park out rate is a mean park out rate, a distribution of the park out rate, or a combination thereof.

9. The method of claim 8, wherein the distribution of the park out rate represents a number of the park out events per epoch per day.

10. An apparatus comprising:
at least one processor; and
at least one memory including computer program code for one or more programs,
the at least one memory and the computer program code configured to, with the at least one processor, cause the apparatus to perform at least the following,
receive parking data from a plurality of connected vehicles, wherein the parking data indicate park in events, park out events, or a combination thereof that are not associated with each other to anonymize the parking data;
perform a first filtering of the parking data to remove the park out events that occur within a time interval and that occur before a first one of the park in events occurring within the time interval, and to remove the park in events that occur within the time interval and that occur after a last one of the park out events that occur within the time interval;
perform a second filtering of the parking data remaining after the first filtering to remove one or more of the park in events or one or more of the park out events so that a number of the park in events is balanced with a number of the park out events; and
calculate parking duration data from the park in events and the park out events remaining after the second filtering.

11. The apparatus of claim 10, wherein the second filtering causes the apparatus to:
traverse the time interval;
when a park in event is encountered in the time interval, increment a balance counter by one;
when a park out event is encountered in the time interval, decrement the balance counter by one; and
remove the encountered park out event from the parking data when the balance counter would be decremented below an initial value of the balance counter.

12. The apparatus of claim 11, wherein the second filtering further causes the apparatus to:
when the balance counter is greater than the initial value after the traversing of the time interval, re-traverse the time interval; and
when a park in event is encountered, remove the encountered park in event from the parking data and decrement the balance counter until the balance counter equals the initial value.

13. The apparatus of claim 10, wherein the apparatus is further caused to:
determine a probability distribution of parking occupancy for a parking area occupied by the plurality of vehicles as a function of time based on the park in events and the parking duration data; and
calculate a park out rate for the parking area based on the probability distribution.

14. The apparatus of claim 13, wherein the apparatus is further caused to:
determine a penetration rate for the plurality of connected vehicles,
wherein the penetration rate represents a proportion of the connected vehicles to all vehicles parked in the parking area; and
wherein the park out rate is further based on the penetration rate.

15. The apparatus of claim 13, wherein the park out rate is a mean park out rate, a distribution of the park out rate, or a combination thereof.

16. The apparatus of claim 15, wherein the distribution of the park out rate represents a number of the park out events per epoch per day.

17. A non-transitory computer-readable storage medium for generating parking occupancy data using a machine learning model, carrying one or more sequences of one or more instructions which, when executed by one or more processors, cause an apparatus to at least perform the following steps:
receiving parking data from a plurality of connected vehicles, wherein the parking data indicate park in events, park out events, or a combination thereof that are not associated with each other to anonymize the parking data;
performing a first filtering of the parking data to remove the park out events that occur within a time interval and that occur before a first one of the park in events occurring within the time interval, and to remove the park in events that occur within the time interval and that occur after a last one of the park out events that occur within the time interval;
performing a second filtering of the parking data remaining after the first filtering to remove one or more of the park in events or one or more of the park out events so that a number of the park in events is balanced with a number of the park out events; and
calculating parking duration data from the park in events and the park out events remaining after the second filtering.

18. The non-transitory computer-readable storage medium of claim 17, wherein the second filtering causes the apparatus to perform:
traversing the time interval;
when a park in event is encountered in the time interval, incrementing a balance counter by one;
when a park out event is encountered in the time interval, decrementing the balance counter by one; and
removing the encountered park out event from the parking data when the balance counter would be decremented below an initial value of the balance counter.

19. The non-transitory computer-readable storage medium of claim 18, wherein the second filtering causes the apparatus to further perform:
when the balance counter is greater than the initial value after the traversing of the time interval, re-traversing the time interval; and
when a park in event is encountered, removing the encountered park in event from the parking data and decrementing the balance counter until the balance counter equals the initial value.

20. The non-transitory computer-readable storage medium of claim 17, wherein the apparatus is caused to further perform:

determining a probability distribution of parking occupancy for a parking area occupied by the plurality of vehicles as a function of time based on the park in events and the parking duration data; and calculating a park out rate for the parking area based on the probability distribution.

* * * * *